Figure 1:
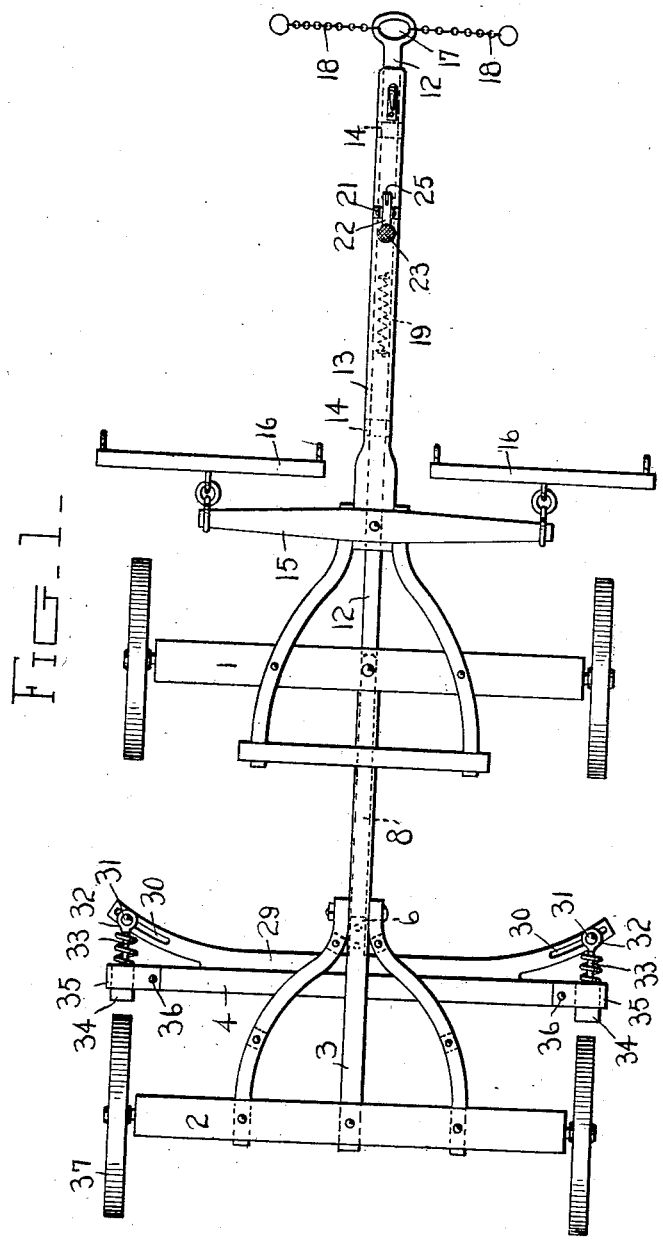

H. COPELAND.
VEHICLE BRAKE.
APPLICATION FILED NOV. 4, 1907.

918,129.

Patented Apr. 13, 1909.
3 SHEETS—SHEET 1.

Witnesses
L. B. James
John S. Powers

Inventor
H. Copeland
By Chandler & Chandler
Attorney.

H. COPELAND.
VEHICLE BRAKE.
APPLICATION FILED NOV. 4, 1907.
918,129.
Patented Apr. 13, 1909.
3 SHEETS—SHEET 2.
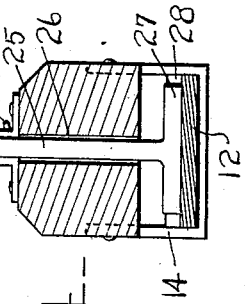
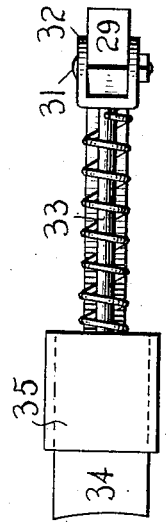
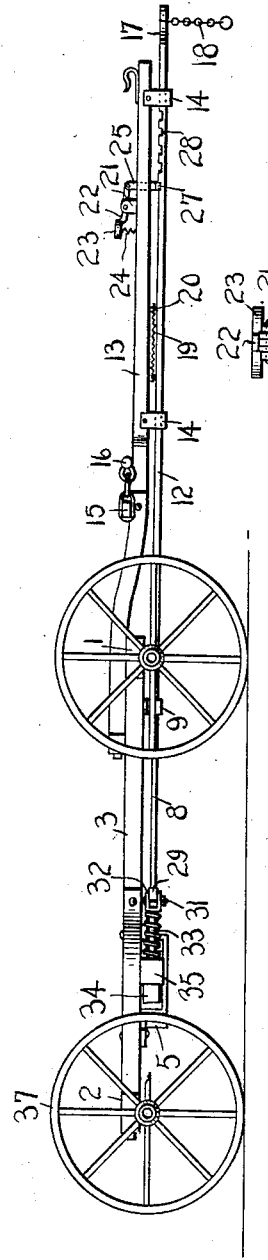
Witnesses
L. B. James
John S. Orms.
Inventor
H. Copeland
By Chandler & Chandler
Attorneys H. COPELAND.
VEHICLE BRAKE.
APPLICATION FILED NOV. 4, 1907.
918,129.
Patented Apr. 13, 1909.
3 SHEETS—SHEET 3.
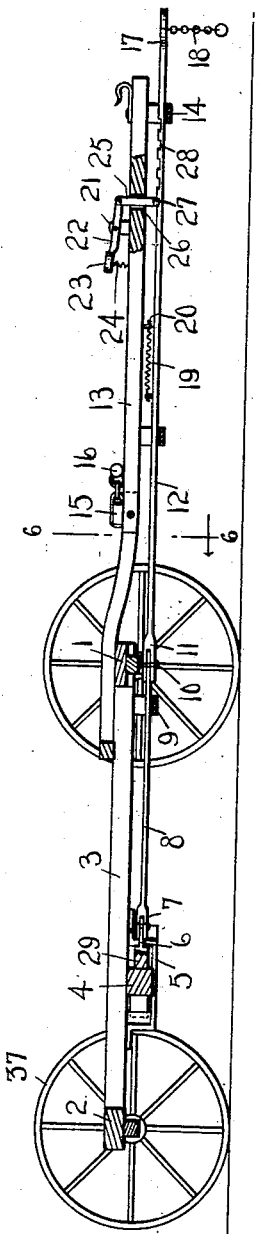
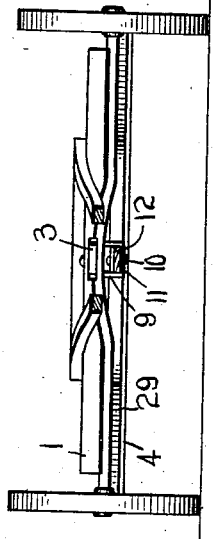
Witnesses
L. B. James
John S. Powrs
Inventor
H. Copeland
By Chandlee & Chandlee
Attorneys

UNITED STATES PATENT OFFICE.

HARRISON COPELAND, OF BEALLSVILLE, MARYLAND.

VEHICLE-BRAKE.

No. 918,129.  Specification of Letters Patent.  Patented April 13, 1909.

Application filed November 4, 1907. Serial No. 400,573.

*To all whom it may concern:*

Be it known that I, HARRISON COPELAND, a citizen of the United States, residing at Beallsville, in the county of Montgomery, State of Maryland, have invented certain new and useful Improvements in Vehicle-Brakes; and I do hereby declare the following to be a full, clear, and exact description of the invention, such as will enable others skilled in the art to which it appertains to make and use the same.

This invention relates to new and useful improvements in vehicle brakes and it has particular reference to an automatically operated vehicle brake, in which the pull of the horses is relied upon through novel mechanical connections, to set the brake shoes upon the wheel.

In connection with a vehicle brake of the above general type, the invention aims as a primary object to provide a novel construction, combination and arrangement of parts the details of which will appear in the course of the following description, in which reference is had to the accompanying drawings, forming a part of this specification, like characters of reference designating similar parts, throughout the several views, wherein: Figure 1 is a plan view of a vehicle frame showing the manner of use of the brake comprehended in the present invention. Fig. 2 is a side elevation of such frame and the brake mounted thereon. Fig. 3 is a section taken longitudinally through the same. Fig. 4 is a section showing the manner in which one of the mechanical elements employed for setting the brake is engaged by a treadle lock. Fig. 5 is a detailed view showing the arrangement of one of the brake shoes and its adjuncts, the other brake shoe being a counterpart in construction. Fig. 6 is a section on the line 6—6 of Fig. 1.

In the accompanying drawings, the numeral 1 designates the front truck, and the numeral 2 the rear truck, the trucks 1 and 2 being connected by a coupling pole 3. Supported from the rear part of the wagon frame is a transverse brake beam 4, which is slidable with relation to a supporting bracket 5. Projecting from the forward face of the beam 4 is a lug 6, which is received pivotally between the bifurcations 7 of a longitudinal bar 8, the latter being slidable through a supporting bracket 9 and extending to a point adjacent the front axle. The end of the bar 8 is received pivotally as at 10 between the bifurcations 11 of a second bar 12. This bar 12 is disposed below the tongue 13 in slidable relation to supporting bracket 14 carried by said tongue. The latter carries the double tree 15, from which the swingle trees 16 are suspended. The bar 12 is formed at its front end with a loop 17, to which the yoke chains 18 are connected. Fixed to the bar 12, is the rear end of a retractile coil spring 19, the front end of which spring is connected to a lug 20 on the tongue 13. The tongue 13 is provided at some distance from its front end with spaced bracket bearings 21 between which is pivoted a lever 22 having its rear end formed as a treadle 23 and pressed upwardly by a spring 24. The lever 22 is pivoted at its front end to a vertically disposed latch member 25, slidable through an opening 26 formed in the tongue 13 and having its lower end formed with a latch head 27 for engagement in any one of a series of notches 28 provided in the upper face of the bar 12.

The beam 4 has secured to its forward face, curved members 29, disposed in horizontal planes and formed at their outer ends with slots 30 for the reception of pins 31, which latter are held in ears 32, provided at the rear ends of stems 33. The stems 33 extend rearwardly from the brake shoes 34, the latter being slidable through suitably formed guides 35, pivoted as at 36 at the ends of the beam 4.

In use, as soon as it is desired to apply the brake, the driver depresses the rear end of the lever 22 with his foot so as to disengage the head 27 from the notch 28, in which it was engaged, at which time the back pull of the horses on a down grade will cause the bars 8 and 12 to have a rearward movement with relation to the vehicle frame and the tongue 13. In such rearward movement, the shoes 34 are brought into yieldable frictional contact with the rear wheels 37 and are held in such contacting relation by the engagement of the latch head 27 in the proper notch 28, when the lever 22 is released by the foot. When it is desired to release the brake when the wagon is traveling on the level or on an upgrade, the lever 22 is once more depressed and by the influence of the retractile spring 19 the bar 12 will be shifted forward thereby disengaging the brake from the wheels. The slots 30 are provided to compensate for the pivotal movement of the guide 35.

What is claimed is:

The combination with a wagon frame, the tongue, and the wheels, of a brake comprising a beam slidably supported from said frame, a bar connected to said beam, a second bar pivoted to said first named bar, a retractile coil spring connected to said second bar and at its forward end to said tongue, displaceable means for locking said second bar with relation to said tongue and yieldably mounted brake shoes provided at the ends of said beam.

In testimony whereof, I affix my signature, in presence of two witnesses.

HARRISON COPELAND.

Witnesses:
    DAVID O. COPELAND,
    CHAS. M. MOORE.